US012799604B2

(12) United States Patent
Ushio

(10) Patent No.: US 12,799,604 B2
(45) Date of Patent: Nov. 17, 2026

(54) REDUCING AGENT COMPOSITION FOR IRON OXIDE AND/OR IRON HYDROXIDE

(71) Applicant: KAO CORPORATION, Tokyo (JP)

(72) Inventor: Noriaki Ushio, Tokyo (JP)

(73) Assignee: KAO CORPORATION, Tokyo (JP)

( * ) Notice: Subject to any disclaimer, the term of this patent is extended or adjusted under 35 U.S.C. 154(b) by 455 days.

(21) Appl. No.: 18/275,866

(22) PCT Filed: Feb. 10, 2022

(86) PCT No.: PCT/JP2022/005372

§ 371 (c)(1),
(2) Date: Aug. 4, 2023

(87) PCT Pub. No.: WO2022/172999

PCT Pub. Date: Aug. 18, 2022

(65) Prior Publication Data

US 2024/0133046 A1 Apr. 25, 2024

(30) Foreign Application Priority Data

Feb. 12, 2021 (JP) ................................ 2021-021151

(51) Int. Cl.
*C23G 1/19* (2006.01)
*C01G 49/02* (2006.01)
*C09D 5/08* (2006.01)

(52) U.S. Cl.
CPC ............... *C23G 1/19* (2013.01); *C01G 49/02* (2013.01); *C09D 5/08* (2013.01)

(58) Field of Classification Search
CPC ............ C23G 1/088; C23G 1/14; C23G 1/19; C01G 49/02; C09D 5/08
See application file for complete search history.

(56) References Cited

U.S. PATENT DOCUMENTS

| | | | |
|---|---|---|---|
| 5,078,894 A | 1/1992 | Horwitz et al. | |
| 2004/0102344 A1 * | 5/2004 | Nakayama ............... | C11D 3/33 510/202 |

FOREIGN PATENT DOCUMENTS

| | | | |
|---|---|---|---|
| JP | S49-3811 B1 | | 1/1974 |
| JP | S57-128767 A | | 8/1982 |
| JP | H0196299 A | | 4/1989 |
| JP | 5-507305 A | | 10/1993 |
| JP | H10-251694 A | | 9/1998 |
| JP | 2017203087 A | | 11/2017 |
| JP | 2018127661 A | | 8/2018 |
| JP | 2019099869 A | | 6/2019 |
| JP | 2020084304 A | * | 6/2020 |
| JP | 2020180359 A | | 11/2020 |
| WO | WO-2002088427 A1 | | 11/2002 |
| WO | WO-2020217666 A1 | | 10/2020 |

OTHER PUBLICATIONS

English language machine translation of JP2018-127661A (pub date Aug. 16, 2018).*
Extended European Search Report issued Sep. 27, 2024, in European Patent Application No. 22752821.3, 6 pages.
International Search Report issued Apr. 19, 2022 in PCT/JP2022/005372, 2 pages.

* cited by examiner

*Primary Examiner* — Mark Kopec

(74) *Attorney, Agent, or Firm* — Element IP, PLC

(57) ABSTRACT

A reducing agent composition for iron oxide and/or iron hydroxide comprising components (A) to (C) and having a pH within a range from 7 to 11, wherein when the component (A) is dissolved in an aqueous solution containing the components (B) and (C), a redox potential reaches −600 mV or less within 20 minutes after the dissolution of the component (A) is started, and a rate of change in redox potential reaches a value of 0 mV or more per minute within 60 minutes after the dissolution of the component (A) is started; and a method for reducing iron oxide and/or iron hydroxide, comprising bringing the reducing agent composition into contact with iron oxide and/or iron hydroxide. (A): Reducing agent; (B): Water-soluble metal chelating agent; and (C): Amine compound.

18 Claims, No Drawings

REDUCING AGENT COMPOSITION FOR IRON OXIDE AND/OR IRON HYDROXIDE

FIELD OF THE INVENTION

The present invention relates to a reducing agent composition for iron oxide and/or iron hydroxide, and a method for reducing iron oxide and/or iron hydroxide using the reducing agent composition.

BACKGROUND OF THE INVENTION

In machines, equipment and the like which are in contact with water, iron oxide is generated in various environments, and deteriorates the performance of the machines and equipment. For example, in tap water piping, boiler piping for electric power plants, residential environment equipment and the like, deposition of iron oxide causes deterioration of performance, and sanitary or appearance problems. In reactor decommissioning in nuclear power plants, radioactive material decontamination work is required, and since radioactive materials exist in such a matter that they were kneaded into iron oxide films deposited on matrixes, it is desirable to efficiently dissolve iron oxide films.

Thus, various iron oxide removal techniques have been proposed. For example, Patent Literature 1 discloses a reducing agent composition containing thiourea dioxide, a specific alkali metal salt anhydride and an alkali metal bicarbonate. Patent Literature 2 discloses a derusting composition containing a basic compound, a water-soluble metal chelating agent and thiourea dioxide.

CITATION LIST

Patent Literatures

Patent Literature 1: JP-A-57-128767
Patent Literature 2: WO 2002/088427

SUMMARY OF THE INVENTION

The present invention provides a reducing agent composition for iron oxide and/or iron hydroxide containing the following components (A) to (C) and having a pH within a range from 7 to 11, wherein when the component (A) is dissolved in an aqueous solution containing the components (B) and (C), a redox potential reaches −600 mV or less within 20 minutes after the dissolution of the component (A) is started, and a rate of change in redox potential reaches a value of 0 mV or more per minute within 60 minutes after the dissolution of the component (A) is started:

(A) a reducing agent;
(B) a water-soluble metal chelating agent; and
(C) an amine compound.

Further, the present invention provides a method for reducing iron oxide and/or iron hydroxide, including bringing the reducing agent composition into contact with iron oxide and/or iron hydroxide.

DETAILED DESCRIPTION OF THE INVENTION

For the derusting composition disclosed in Patent Literature 2, caustic alkali is exclusively used as a basic compound. When thiourea dioxide and an alkali agent are mixed in an aqueous solution, a reduction reaction occurs due to generation of dithionous acid as an iron oxide reducing species. However, there is a problem that the time and the amount of dissolution of iron oxide are not sufficient since both the alkali metal bicarbonate used in Patent Literature 1 and the caustic alkali used in Patent Literature 2 have a low rate of generation of dithionous acid, competition with a rate of deactivation of the reducing species due to dissolved oxygen in water arises.

Accordingly, the present invention relates to a reducing agent composition for iron oxide and/or iron hydroxide which can rapidly generate dithionous acid as a reduction-active species from thiourea dioxide, and can sufficiently exhibit a rate of reduction of iron oxide and/or iron hydroxide by maximally suppressing deactivation of the reducing species due to dissolved oxygen in water, and a method for reducing iron oxide and/or iron hydroxide using the reducing agent composition.

The present inventor examined various alkali agents, and resultantly found that by using an amine compound as an alkali agent, dithionous acid as a reduction-active species can be rapidly generated from thiourea dioxide. Accordingly, deactivation of the reducing species due to dissolved oxygen in water can be maximally suppressed to sufficiently exhibit a rate of reduction of iron oxide and/or iron hydroxide. As a result, it was found that iron oxide and/or iron hydroxide can be reduced and dissolved nearly to the stoichiometric amount of thiourea dioxide, leading to completion of the present invention.

The reducing agent composition for iron oxide and/or iron hydroxide according to the present invention can rapidly generate dithionous acid as a reduction-active species from thiourea dioxide, and accordingly, deactivation of the reducing species due to dissolved oxygen in water can be maximally suppressed to sufficiently exhibit a rate of reduction of iron oxide and/or iron hydroxide.

[Component (A): Reducing Agent]

As a reducing agent which is a component (A), thiourea dioxide is suitably used. The content of the component (A) in the reducing agent composition of the present invention is preferably 0.01 mass % or more, more preferably 0.02 mass % or more, further more preferably 0.03 mass % or more, from the viewpoint of the level of the amount of dissolution of iron oxide and/or iron hydroxide, and preferably 7.8 mass % or less, more preferably 7.0 mass % or less, further more preferably 5.0 mass % or less, from the viewpoint of the solubility of the reducing agent.

[Component (B): Water-Soluble Metal Chelating Agent]

Examples of the water-soluble metal chelating agent as a component (B) include aminocarboxylic acid-based compounds such as nitrilotriacetic acid, ethylenediaminetetraacetic acid, diethylenetriaminepentaacetic acid, hydroxyethylethylenediaminetriacetic acid, triethylenetetraminehexaacetic acid, 1,3-propanediaminetetraacetic acid, 1,3-diamino-2-hydroxypropanetetraacetic acid, hydroxyethyliminodiacetic acid, dihydroxyethylglycine, glycol ether diamine tetraacetic acid, dicarboxymethylglutamic acid, ethylenediamine-N,N'-disuccinic acid, L-aspartate-N,N-diacetic acid, N-(2-hydroxyethyl)iminodiacetic acid, methylglycinediacetic acid, 3-hydroxy-2,2'-iminodisuccinic acid, L-glutaminediacetic acid, and salts thereof; phosphonic acid-based compounds such as hydroxyethylidene diphosphonic acid, nitrilotri(methylphosphonic acid), 2-phosphonobutane-1,2,4-tricarboxylic acid, ethylenediamine tetra(methylene phosphonic acid), and salts thereof; and hydroxycarboxylic acid-based compounds such as gluconic acid, citric acid, and salts thereof. Among them, aminocarboxylic acid-based compounds and phosphonic acid-based compounds are preferable.

The content of the component (B) in the reducing agent composition of the present invention is preferably 0.01 mass % or more, more preferably 0.02 mass % or more, further more preferably 0.03 mass % or more, from the viewpoint of the level of the amount of dissolution of iron oxide and/or iron hydroxide, and preferably 40 mass % or less, more preferably 30 mass % or less, further more preferably 20 mass % or less, from the viewpoint of the solubility of the metal chelating agent.

The total content of the component (A) and the component (B) in the reducing agent composition of the present invention is preferably 0.03 mass % or more, more preferably 0.04 mass % or more, further more preferably 0.05 mass % or more, from the viewpoint of the level of the amount of dissolution of iron oxide and/or iron hydroxide, and preferably 40 mass % or less, more preferably 30 mass % or less, further more preferably 20 mass % or less, from the viewpoint of the solubility of the component (A) and the component (B).

On the other hand, when the present invention is applied to radioactive material decontamination work in nuclear power reactor equipment in nuclear power plants, it may be necessary to suppress the amount of dissolution of iron oxide and/or iron hydroxide for reducing the exposure to workers because iron oxide and/or iron hydroxide are dissolved together with radioactive materials. In this respect, when the reducing agent composition of the present invention is used in radioactive material decontamination work, the total content of the component (A) and the component (B) in the reducing agent composition of the present invention is preferably 0.01 mass % or more, more preferably 0.02 mass % or more, further more preferably 0.03 mass % or more, and preferably 0.2 mass % or less, more preferably 0.1 mass % or less, further more preferably 0.08 mass % or less, from the viewpoint of preventing dissolution of extra iron oxide and/or iron hydroxide for reducing the exposure.

[Component (C): Amine Compound]

Examples of the amine compound as a component (C) include hydrazine, methylamine, monoethanolamine, N,N-dimethylaminoethanol, N,N-diethylaminoethanol, N,N-dibutylaminoethanol, N-(β-aminoethyl)ethanolamine, N-methylethanolamine, 2-ethylaminoethanol, mono-n-butylethanolamine, N-methyldiethanolamine, N-ethyldiethanolamine, mono-n-butyldiethanolamine, morpholine, piperazine, aminoethylpiperazine, homopiperazine, piperidine, ethylenediamine, diethylenetriamine, 1,2-propanediamine, dimethylethylenediamine, pentamethyldiethylenetriamine, tetramethylethylenediamine, dimethylaminohexanol, polyethyleneimine, hydrazine, 4-aminomorpholine, and 4-aminopiperidine, and among them, those having a 1,2-diamine structure, such as N-(β-aminoethyl)ethanolamine, piperazine, homopiperazine, ethylenediamine, diethylenetriamine and 1,2-propanediamine, are preferable from the viewpoint of the rapidity of generation of the reduction-active species.

The reason why an amine compound having a 1,2-diamine structure is preferable as the component (C) may be as follows. For example, ethylenediamine having a 1,2-diamine structure undergoes an addition reaction with thiourea dioxide to generate aminoethylguanidine (reaction 1). This compound rapidly undergoes an intramolecular cyclization reaction to form aminoimidazoline (reaction 2). Further, ethylenediamine undergoes an addition reaction with the aminoimidazoline to generate aminoethyl aminoimidazoline (reaction 3). This reaction is known to proceed in a quantitative way such that the molar ratio between thiourea dioxide and ethylenediamine is 1:2, and the reaction proceeds very rapidly. As a result, the thiourea dioxide is decomposed to rapidly generate dithionous acid as a reduction-active species, so that deactivation of the reducing species due to dissolved oxygen in water can be maximally suppressed to sufficiently exhibit a rate of reduction of iron oxide and/or iron hydroxide. This reaction may be specific to an amine having a 1,2-diamine structure.

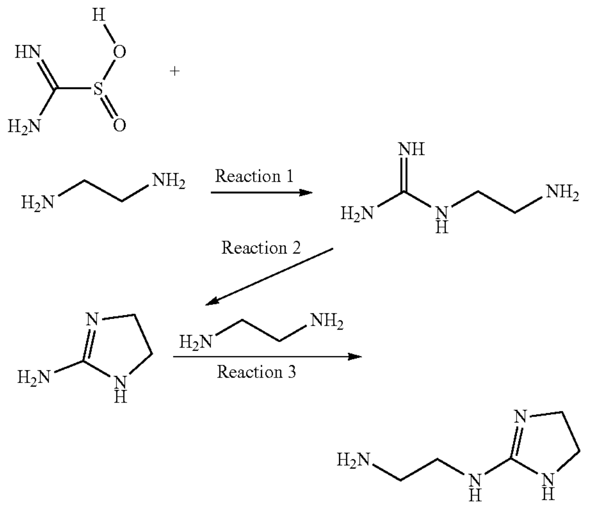

The content of the component (C) in the reducing agent composition of the present invention is preferably 0.01 mass % or more, more preferably 0.02 mass % or more, further more preferably 0.03 mass % or more, from the viewpoint of the level of the amount of dissolution of iron oxide and/or iron hydroxide, and preferably 25 mass % or less, more preferably 20 mass % or less, further more preferably 15 mass % or less, from the viewpoint of pH control.

The molar ratio of the component (C) to the component (A), (C)/(A), in the reducing agent composition of the present invention is preferably 1.5 or more, more preferably 1.8 or more, further more preferably 2 or more, from the viewpoint of the level of the amount of dissolution of iron oxide and/or iron hydroxide, and preferably 10 or less, more preferably 9 or less, further more preferably 8 or less, from the viewpoint of pH control.

[Solvent and Optional Components]

The reducing agent composition of the present invention preferably has water as a solvent, and may contain a surfactant, an organic acid, an inorganic acid, an organic salt, an inorganic salt, an alkali agent other than amine compounds, and the like, in addition to the components (A) to (C).

[pH]

From the viewpoint of the level of the amount of dissolution of iron oxide and/or iron hydroxide, the pH of the reducing agent composition of the present invention is 7 or more, preferably 7.5 or more, more preferably 8 or more, further more preferably 8.5 or more, and 11 or less, preferably 10.5 or less, more preferably 10 or less, further more preferably 9.5 or less.

[Redox Potential]

The reducing agent composition of the present invention is required to satisfy the contents of the components (A) to (C) and pH described above and satisfy the following requirements. That is, when the reducing agent (A) is dissolved in an aqueous solution containing the water-soluble metal chelating agent (B) and the amine compound (C), the redox potential should reach −600 mV or less within 20 minutes after the dissolution of the component (A) is started, and the rate of change in redox potential should reach a value of 0 mV or more per minute within 60 minutes after the dissolution of the component (A) is started.

[Iron Oxide and/or Iron Hydroxide to be Reduced]

The iron oxide and iron hydroxide to be reduced in the present invention are generally known as red rust. Specifically, examples of the iron oxide include hematite represented by $\alpha$-$Fe_2O_3$, and maghemite represented by $\gamma$-$Fe_2O_3$. Examples of the iron hydroxide include iron hydroxide (III) represented by $Fe(OH)_3$, and iron oxyhydroxides such as geothite represented by $\alpha$-FeOOH, akaganeite represented by $\beta$-FeOOH, and lepidocrocite represented by $\gamma$-FeOOH.

[Reduction Method]

By bringing the above-described reducing agent composition of the present invention into contact with iron oxide and/or iron hydroxide, the iron oxide and/or iron hydroxide can be reduced. The temperature at which the reducing agent composition of the present invention is brought into contact with iron oxide and/or iron hydroxide is preferably 5 °C or higher, more preferably 10 °C or higher, further more preferably 20 °C or higher, and preferably 50 °C or lower, more preferably 45 °C or lower, further more preferably 40 °C or lower. It is preferable to bring iron oxide and/or iron hydroxide into contact with a liquid in which the component (B) and the component (C) in the present invention are dissolved, followed by dissolution of the component (A).

In connection with the embodiments described above, preferred aspects of the present invention are further disclosed below.

<1> A reducing agent composition for iron oxide and/or iron hydroxide comprising the following components (A) to (C) and having a pH within a range from 7 to 11, wherein when the component (A) is dissolved in an aqueous solution containing the components (B) and (C), a redox potential reaches −600 mV or less within 20 minutes after the dissolution of the component (A) is started, and a rate of change in redox potential reaches a value of 0 mV or more per minute within 60 minutes after the dissolution of the component (A) is started:
(A) a reducing agent;
(B) a water-soluble metal chelating agent; and
(C) an amine compound.

<2> The reducing agent composition according to <1>, wherein the component (A) is thiourea dioxide.

<3> The reducing agent composition according to <1> or <2>, wherein a content of the component (A) is preferably 0.01 mass % or more, more preferably 0.02 mass % or more, further more preferably 0.03 mass % or more, and preferably 7.8 mass % or less, more preferably 7.0 mass % or less, further more preferably 5.0 mass % or less.

<4> The reducing agent composition according to any one of <1> to <3>, wherein the component (B) is one or more selected from the group consisting of an aminocarboxylic acid-based compound, a phosphonic acid-based compound and a hydroxycarboxylic acid-based compound.

<5> The reducing agent composition according to any one of <1> to <4>, wherein the component (B) is one or more selected from the group consisting of an aminocarboxylic acid-based compound and a phosphonic acid-based compound.

<6> The reducing agent composition according to any one of <1> to <5>, wherein the component (B) is an aminocarboxylic acid-based compound.

<7> The reducing agent composition according to <6>, wherein the aminocarboxylic acid-based compound is one or more selected from the group consisting of nitrilotriacetic acid, ethylenediaminetetraacetic acid, diethylenetriaminepentaacetic acid, hydroxyethylethylenediaminetriacetic acid, triethylenetetraminehexaacetic acid, 1,3-propanediaminetetraacetic acid, 1,3-diamino-2-hydroxypropanetetraacetic acid, hydroxyethyliminodiacetic acid, dihydroxyethylglycine, glycol ether diamine tetraacetic acid, dicarboxymethylglutamic acid, ethylenediamine-N,N'-disuccinic acid, L-aspartate-N,N-diacetic acid, N-(2-hydroxyethyl)iminodiacetic acid, methylglycinediacetic acid, 3-hydroxy-2,2'-iminodisuccinic acid, L-glutaminediacetic acid, and salts thereof.

<8> The reducing agent composition according to any one of <1> to <7>, wherein a content of the component (B) is preferably 0.01 mass % or more, more preferably 0.02 mass % or more, further more preferably 0.03 mass % or more, and preferably 40 mass % or less, more preferably 30 mass % or less, further more preferably 20 mass % or less.

<9> The reducing agent composition according to any one of <1> to <8>, wherein a total content of the component (A) and the component (B) is preferably 0.03 mass % or more, more preferably 0.04 mass % or more, further more preferably 0.05 mass % or more, and preferably 40 mass % or less, more preferably 30 mass % or less, further more preferably 20 mass % or less.

<10> The reducing agent composition according to any one of <1> to <9>, wherein the component (C) is a compound having a 1,2-diamine structure.

<11> The reducing agent composition according to any one of <1> to <10>, wherein the compound having a 1,2-diamine structure is one or more selected from the group consisting of N-((3-aminoethyl)ethanolamine, piperazine, homopiperazine, ethylenediamine, diethylenetriamine and 1,2-propanediamine.

<12> The reducing agent composition according to any one of <1> to <11>, wherein a content of the component (C) is preferably 0.01 mass % or more, more preferably 0.02 mass % or more, further more preferably 0.03 mass % or more, and preferably 25 mass % or less, more preferably 20 mass % or less, further more preferably 15 mass % or less.

<13> The reducing agent composition according to any one of <1> to <12>, wherein a molar ratio of the component (C) to the component (A), (C)/(A), is preferably 1.5 or more, more preferably 1.8 or more, further more preferably 2 or more, and preferably 10 or less, more preferably 9 or less, further more preferably 8 or less, from the viewpoint of pH control.

<14> The reducing agent composition according to any one of <1> to <13>, wherein a pH is preferably 7.5 or more, more preferably 8 or more, further more preferably 8.5 or more, and preferably 10.5 or less, more preferably 10 or less, further more preferably 9.5 or less.

<15> A method for reducing iron oxide and/or iron hydroxide, comprising bringing the reducing agent composition according to any one of <1> to <14> into contact with iron oxide and/or iron hydroxide.

<16> The reduction method according to <15>, wherein a temperature at which the reducing agent composition is brought into contact with iron oxide and/or iron hydroxide is preferably 5 °C or higher, more preferably 10 °C or higher, further more preferably 20 °C or higher, and preferably 50 °C or lower, more preferably 45 °C or lower, further more preferably 40 °C or lower.

EXAMPLES

Examples 1 to 15 and Comparative Examples 1 to 6

Aqueous solutions shown in Tables 1 and 2 were prepared, and the following hematite dissolution test and redox potential measurement were conducted.

<pH Measurement Method>

Thiourea dioxide was added while components other than the thiourea dioxide in each of the compositions shown in Tables 1 and 2 were stirred with a magnetic stirrer, and a pH at which the thiourea dioxide was fully dissolved was measured using a portable pH meter D-72 (manufactured by HORIBA, Ltd.) and a pH electrode 9615S-10D (manufactured by HORIBA, Ltd.).

<Hematite Dissolution Test Method>

In a glass vessel having a volume of 50 mL, 40 g of a composition was prepared by mixing components other than thiourea dioxide in each of the compositions shown in Tables 1 and 2, 0.4 g of hematite was added, and the mixture was stirred at room temperature using a magnetic stirrer. After the stirring was performed for 1 hour after thiourea dioxide was added, sampling was performed, the sample was filtered using a disposable filter DISMIC 25CS020AN (manufactured by AS ONE Corporation), the concentration of iron ions in the aqueous phase was then measured using a water analysis photometer PF-12 (manufactured by MACHEREY-NAGEL GmbH & Co. KG) and an iron measurement reagent NANOCOLOR Tube Test Iron 3 (manufactured by MACHEREY-NAGEL GmbH & Co. KG), and the concentration of iron ions dissolved from the hematite was calculated.

Tables 1 and 2 show, together with the concentrations of iron ions, ratios of the concentration of iron ions (ppm) to the total content of the components (A) and (B) (mass %) as an index of the level of ability of each composition to reduce iron oxide and/or iron hydroxide.

<Redox Potential Measurement Method>

In a glass vessel having a volume of 100 mL, 100 g of a composition was prepared by mixing the components other than thiourea dioxide in each of the compositions shown in Tables 1 and 2, and stirred at room temperature using a magnetic stirrer. While the stirring was performed, a portable pH meter D-72 (manufactured by HORIBA, Ltd.) and an ORP electrode 9300-10D (manufactured by HORIBA, Ltd.) were used to record the measured value of redox potential at intervals of 10 seconds from a time point at which the thiourea dioxide was added, with the time point defined as 0 second. Tables 1 and 2 show the time (min) until the redox potential reaches −600 mV or less, and the time (min) until the rate of change in redox potential reaches 0 mV or more per minute.

TABLE 1

| | | Component (mass %) | Example 1 | 2 | 3 | 4 | 5 | 6 | 7 | 8 |
|---|---|---|---|---|---|---|---|---|---|---|
| (A) | (A-1) | Thiourea dioxide | 0.26 | 0.26 | 0.26 | 0.26 | 0.26 | 0.26 | 0.26 | 0.26 |
| (B) | (B-1) | Disodium nitrilotriacetate (NTA•2Na) | — | — | — | — | — | — | — | — |
| | (B-2) | Nitrilotriacetic acid (NTA•3H) | 1.20 | 1.20 | 1.20 | 1.20 | 1.20 | 1.20 | 1.20 | 1.20 |
| | (B-3) | Trisodium methylglycinediacetate (MGDA•3Na) | — | — | — | — | — | — | — | — |
| (C) | (C-1) | Ethylenediamine | 0.85 | — | — | — | — | — | — | — |
| | (C-2) | Diethylenetriamine | — | 1.10 | — | — | — | — | — | — |
| | (C-3) | 1,2-Propanediamine | — | — | 1.20 | — | — | — | — | — |
| | (C-4) | Piperazine | — | — | — | 1.40 | — | — | — | — |
| | (C-5) | Aminoethylethanolamine | — | — | — | — | 1.40 | — | — | — |
| | (C-6) | Monoethanolamine | — | — | — | — | — | 1.10 | — | — |
| | (C-7) | Methylamine | — | — | — | — | — | — | 0.66 | — |
| | (C-8) | Hydrazine | — | — | — | — | — | — | — | 3.10 |
| | | Hydrochloric acid | — | — | — | — | — | — | — | — |
| | | Water | Balance | | | | | | | |
| | | pH | 9.0 | 9.1 | 9.0 | 9.0 | 9.0 | 9.0 | 9.6 | 9.1 |
| | | Molar ratio (C)/(A) | 5.83 | 4.39 | 4.79 | 6.69 | 5.54 | 7.42 | 8.76 | 39.84 |
| | | Amount of dissolution of iron ions (ppm) | 2000 | 1800 | 1700 | 1600 | 1500 | 1000 | 1000 | 1200 |
| | | Amount of dissolution of iron ions (ppm)/[(A) + (B)](%) | 1370 | 1233 | 1164 | 1096 | 1027 | 685 | 685 | 822 |
| | | Time (min) until redox potential reaches −600 mV or less | 1 | 0.5 | 3 | 8 | 1 | 18 | 2 | 3 |
| | | Time (min) until rate of change in redox potential reaches 0 mV or more per minute | 8 | 5 | 15 | 20 | 4 | 35 | 25 | 18 |

| | | Component (mass %) | Example 9 | 10 | 11 | 12 | 13 | 14 | 15 |
|---|---|---|---|---|---|---|---|---|---|
| (A) | (A-1) | Thiourea dioxide | 0.26 | 0.26 | 0.26 | 0.43 | 0.26 | 0.035 | 6.6 |
| (B) | (B-1) | Disodium nitrilotriacetate (NTA•2Na) | 1.20 | 1.20 | — | — | — | — | — |
| | (B-2) | Nitrilotriacetic acid (NTA•3H) | — | — | 1.20 | 0.43 | — | 0.035 | 30 |
| | (B-3) | Trisodium methylglycinediacetate (MGDA•3Na) | — | — | — | — | 1.20 | — | — |
| (C) | (C-1) | Ethylenediamine | 0.30 | 0.40 | 0.40 | 0.50 | 0.30 | 0.035 | 21 |
| | (C-2) | Diethylenetriamine | — | — | — | — | — | — | — |
| | (C-3) | 1,2-Propanediamine | — | — | — | — | — | — | — |
| | (C-4) | Piperazine | — | — | — | — | — | — | — |
| | (C-5) | Aminoethylethanolamine | — | — | — | — | — | — | — |
| | (C-6) | Monoethanolamine | — | — | — | — | — | — | — |

TABLE 1-continued

| | | | | | | | |
|---|---|---|---|---|---|---|---|
| (C-7) Methylamine | — | — | — | — | — | — | — |
| (C-8) Hydrazine | — | — | — | — | — | — | — |
| Hydrochloric acid | 0.17 | — | — | — | — | — | — |
| Water | | | | Balance | | | |
| pH | 9.0 | 8.8 | 8.8 | 9.0 | 10.0 | 9.0 | 9.7 |
| Molar ratio (C)/(A) | 2.06 | 2.74 | 2.74 | 2.09 | 2.06 | 1.80 | 5.78 |
| Amount of dissolution of iron ions (ppm) | 1600 | 1700 | 1700 | 1200 | 1500 | 50 | 35000 |
| Amount of dissolution of iron ions (ppm)/[(A) + (B)](%) | 1096 | 1164 | 1164 | 1395 | 1027 | 714 | 956 |
| Time (min) until redox potential reaches −600 mV or less | 2 | 3 | 3 | 5 | 3 | 20 | 5 |
| Time (min) until rate of change in redox potential reaches 0 mV or more per minute | 10 | 15 | 15 | 10 | 9 | 15 | 10 |

TABLE 2

| | | | Comparative Example | | | | | |
|---|---|---|---|---|---|---|---|---|
| | | Component (mass %) | 1 | 2 | 3 | 4 | 5 | 6 |
| (A) | (A-1) | Thiourea dioxide | 0.26 | 0.26 | 0.26 | 0.26 | 0.53 | — |
| (B) | (B-1) | Disodium nitrilotriacetate (NTA•2Na) | 1.20 | 1.20 | — | 0.60 | — | 0.60 |
| | (B-2) | Nitrilotriacetic acid (NTA•3H) | — | — | 1.20 | — | — | — |
| (C) | (C-1) | Ethylenediamine | — | — | — | — | 0.25 | 0.25 |
| | (C-7) | Methylamine | — | — | — | — | — | — |
| (C') | (C'-1) | Caustic soda | 0.09 | — | — | — | — | — |
| | (C'-2) | Sodium carbonate | — | 0.24 | — | — | — | — |
| | (C'-3) | Ammonia | — | — | 1.55 | — | — | — |
| | | Water | | | Balance | | | |
| | | pH | 9.0 | 9.0 | 9.1 | 4.8 | 8.9 | 9.1 |
| | | Molar ratio (C)/(A) | 0.92 | 0.92 | 37.49 | 0.00 | 0.86 | — |
| | | Amount of dissolution of iron ions (ppm) | 750 | 500 | 800 | 250 | 5 | 0.5 |
| | | Amount of dissolution of iron ions (ppm)/[(A) + (B)](%) | 514 | 342 | 548 | 291 | 9 | 1 |
| | | Time (min) until redox potential reaches −600 mV or less | 36 | 45 | 22 | * | * | * |
| | | Time (min) until rate of change in redox potential reaches 0 mV or more per minute | 50 | 60 | 45 | ** | 10 | ** |

*: Redox potential does not reach −600 mV or less within 60 minutes

**: Rate of change in redox potential does not reach 0 mV or more per minute within 60 minutes

The invention claimed is:

1. A reducing agent composition for iron oxide and/or iron hydroxide comprising components (A) to (C):

(A) a reducing agent;

(B) a water-soluble metal chelating agent; and (C) an amine compound, the reducing agent composition having a pH within a range from 7 to 11, wherein when the component (A) is dissolved in an aqueous solution containing the components (B) and (C), a redox potential reaches −600 mV or less within 18 minutes after the dissolution of the component (A) is started, and a rate of change in redox potential reaches a value of 0 mV or more per minute within 25 minutes after the dissolution of the component (A) is started.

2. The reducing agent composition according to claim 1, wherein the component (A) is thiourea dioxide.

3. The reducing agent composition according to claim 1, wherein the component (B) is an aminocarboxylic acid-based compound.

4. The reducing agent composition according to claim 3, wherein the aminocarboxylic acid-based compound is one or more selected from the group consisting of nitrilotriacetic acid, ethylenediaminetetraacetic acid, diethylenetriamine-pentaacetic acid, hydroxyethylethylenediaminetriacetic acid, triethylenetetraminehexaacetic acid, 1,3-propanediaminetetraacetic acid, 1,3-diamino-2-hydroxypropanetetraacetic acid, hydroxyethyliminodiacetic acid, dihydroxyethylglycine, glycol ether diamine tetraacetic acid, dicarboxymethylglutamic acid, ethylenediamine-N,N'-disuccinic acid, L-aspartate-N,N-diacetic acid, N-(2-hydroxyethyl)iminodiacetic acid, methylglycinediacetic acid, 3-hydroxy-2,2'-iminodisuccinic acid, L-glutaminediacetic acid, and salts thereof.

5. The reducing agent composition according to claim 1, wherein the component (C) is a compound having a 1,2-diamine structure.

6. The reducing agent composition according to claim 5, wherein the compound having a 1,2-diamine structure is one or more selected from the group consisting of N-(β-aminoethyl) ethanolamine, piperazine, homopiperazine, ethylenediamine, diethylenetriamine and 1,2-propanediamine.

7. The reducing agent composition according to claim 1, wherein a molar ratio of the component (C) to the component (A), (C)/(A), is 1.5 or more.

8. The reducing agent composition according to claim 1, wherein a content of the component (A) in the reducing agent composition is 0.01 mass % or more and 7.8 mass % or less relative to a total mass of the reducing agent composition.

9. The reducing agent composition according to claim 1, wherein a content of the component (B) in the reducing agent composition is 0.01 mass % or more and 40 mass % or less relative to a total mass of the reducing agent composition.

10. A method for reducing iron oxide and/or iron hydroxide, comprising bringing the reducing agent composition according to claim 1 into contact with iron oxide and/or iron hydroxide.

11. The method for reducing iron oxide and/or iron hydroxide according to claim 10, wherein the method is carried out in a temperature range of 5 °C or higher and 40 °C or lower.

12. The reducing agent composition according to claim 1, wherein a content of the component (C) in the reducing agent composition is 0.01 mass % or more and 25 mass % or less relative to a total mass of the reducing composition.

13. A reducing agent composition for iron oxide and/or iron hydroxide comprising components (A) to (C):

(A) a reducing agent;

(B) a water-soluble metal chelating agent; and (C) an amine compound, the reducing agent composition having a pH within a range from 7 to 11, wherein a content of the component (C) in the reducing agent composition is within a range of 0.30 to 25 mass % relative to a total mass of the reducing agent composition, wherein the component (C) is at least one selected from the group consisting of hydrazine, methylamine, monoethanolamine, N,N-dimethylaminoethanol, N,N-diethylaminoethanol, N,N-dibutylaminoethanol, N-(β-aminoethyl) ethanolamine, N-methylethanolamine, 2-ethylaminoethanol, mono-n-butylethanolamine, N-methyldiethanolamine, N-ethyldiethanolamine, mono-n-butyldiethanolamine, morpholine, piperazine, aminoethylpiperazine, homopiperazine, piperidine, ethylenediamine, diethylenetriamine, 1,2-propanediamine, dimethylethylenediamine, pentamethyldiethylenetriamine, tetramethylethylenediamine, dimethylaminohexanol, polyethyleneimine, hydrazine, 4-aminomorpholine, and 4-aminopiperidine, and wherein when the component (A) is dissolved in an aqueous solution containing the components (B) and (C), a redox potential reaches −600 mV or less within 18 minutes after the dissolution of the component (A) is started, and a rate of change in redox potential reaches a value of 0 mV or more per minute within 25 minutes after the dissolution of the component (A) is started.

14. The reducing agent composition according to claim 13, wherein the component (A) is thiourea dioxide.

15. The reducing agent composition according to claim 13, wherein the component (B) is an aminocarboxylic acid-based compound.

16. The reducing agent composition according to claim 13, wherein a molar ratio of the component (C) to the component (A), (C)/(A), is 1.5 or more.

17. The reducing agent composition according to claim 13, wherein a content of the component (A) in the reducing agent composition is 0.01 mass % or more and 7.8 mass % or less relative to a total mass of the reducing agent composition.

18. The reducing agent composition according to claim 13, wherein a content of the component (B) in the reducing agent composition is 0.01 mass % or more and 40 mass % or less relative to a total mass of the reducing agent composition.

* * * * *